(12) United States Patent
Fukasawa et al.

(10) Patent No.: US 8,514,064 B2
(45) Date of Patent: Aug. 20, 2013

(54) DOOR MIRROR

(75) Inventors: Yosuke Fukasawa, Ota (JP); Yasushi Kawaji, Ota (JP); Hitoshi Kurihara, Ashikaga (JP)

(73) Assignee: Mitsuba Corporation (JP)

( * ) Notice: Subject to any disclaimer, the term of this patent is extended or adjusted under 35 U.S.C. 154(b) by 563 days.

(21) Appl. No.: 12/682,794

(22) PCT Filed: Oct. 7, 2008

(86) PCT No.: PCT/JP2008/002815
§ 371 (c)(1),
(2), (4) Date: Apr. 13, 2010

(87) PCT Pub. No.: WO2009/050855
PCT Pub. Date: Apr. 23, 2009

(65) Prior Publication Data
US 2010/0238015 A1    Sep. 23, 2010

(30) Foreign Application Priority Data
Oct. 18, 2007  (JP) ................................. 2007-271422

(51) Int. Cl.
*B60Q 1/34*  (2006.01)
(52) U.S. Cl.
USPC ............................ 340/465; 362/494; 340/475
(58) Field of Classification Search
USPC ............... 340/425.5, 463, 465, 475; 362/494
See application file for complete search history.

(56) References Cited

U.S. PATENT DOCUMENTS

| 4,086,128 A | * | 4/1978 | Sugio et al. | ..................... 216/83 |
| 2005/0117236 A1 | * | 6/2005 | Tanaka et al. | ................. 359/876 |
| 2005/0141229 A1 | * | 6/2005 | Sakai | ............................. 362/494 |
| 2005/0146886 A1 | * | 7/2005 | Furuya et al. | ................. 362/494 |

FOREIGN PATENT DOCUMENTS

| JP | 2004-276766 | 10/2001 |
| JP | 2002-079878 | 3/2002 |
| JP | 2004-001710 | 1/2004 |
| JP | 2004-291670 | 10/2004 |
| JP | 2004-291671 | 10/2004 |
| JP | 2005-047411 | 2/2005 |

* cited by examiner

*Primary Examiner* — Brian Zimmerman
*Assistant Examiner* — James Yang
(74) *Attorney, Agent, or Firm* — Gerald E. Hespos; Michael J. Porco; Matthew T. Hespos

(57) ABSTRACT

A door mirror has a turn lamp that can be mounted easily and without an increased size. The turn lamp (2) has a housing (3) and an outer lens (4) that are formed by molding. A light emitting diode (6) is mounted in the housing (3), and the outer lens (4) covers the housing (3). The housing (3) and the outer lens (4) are integrated by a joint (7) produced by injection molding and placed at a butt section at which the housing (3) and the outer lens (4) are butted together. Steps (7c, 7d) are formed at the butt section integrated by the joint (7) of the turn lamp (2), and a lower end edge section (1c) and a left end edge section (1e) that form an opening (1b) of a body (1) of the door mirror (DM) are butted to the steps (7c, 7d).

1 Claim, 4 Drawing Sheets

DOOR MIRROR

BACKGROUND OF THE INVENTION

1. Field of the Invention

The present invention belongs to the technical field of a door mirror to be provided on a vehicle such as an automobile.

2. Description of the Related Art

Generally, a door of a vehicle of this type is provided with a door mirror, which is constructed by providing a mirror for rearward check at a body, and it has been proposed in recent years to add various functions other than rearward check to such a door mirror. For example, there is a door mirror, which is provided with a turn signal lamp that is a light member for indicating the traveling direction (steering direction) of a vehicle so as to strongly attract people around the vehicle together with a side turn signal lamp that is provided singly at a front part, a rear part or the like of the vehicle.

In such a case, a turn signal lamp is to be installed in the body of the door mirror in an integrated manner. Known methods for the installation are: a method (Japanese Published Patent Unexamined Application No. 2005-47411) to form a light source placement part at the body in a concave groove shape, in which a light source constituting a turn signal lamp is to be placed, and fit an outer lens in the light source placement part of the body; a method (Japanese Published Unexamined Patent Application No. 2004-1710) to construct a turn signal lamp preliminarily by integrating an outer lens and a lamp housing, in which a light source is held, by butt joint and install the turn signal lamp in an opening part formed at the body of a door mirror; and the like.

However, the former of the conventional methods described above has problems that the structure of installing a light source directly in the body of a door mirror complicates the shape of the body and an exclusive body becomes necessary and, moreover, the installation operation of the turn signal lamp becomes troublesome. On the other hand, the latter has advantages that the structure of the body can be simplified and installation of the turn signal lamp in the body becomes easy, although in the case of the latter, the structure of integrating a butt joint part of an outer lens and a lamp housing of a turn signal lamp with bonding means such as ultrasonic welding sometimes deteriorates the design and therefore the butt joint part of the turn signal lamp is installed to be covered with the body. Accordingly, there is a problem that the body grows in size since the butt joint part of the turn signal lamp is held inside the body, and these are the problems to be solved by the present invention.

The present invention has been made for the purpose of solving the above problems in view of such a situation, and the invention relates to a door mirror wherein an opening part is formed at a body of a door mirror including a mirror for rearward check, a jointing piece is formed at a butt joint part of an outer lens and a base housing, in which a light source is installed, in a light member by injection molding of resin material in installation of the light member in the opening part, and a positioning part to be made to butt contact with an end edge part constituting the opening part of the body in a positioned manner is formed at the butt joint part integrated by the jointing piece.

The positioning part preferably has a step part formed at the jointing piece.

Still further the positioning part may have a step part composed of the jointing piece and an end face of the outer lens.

The light member preferably is a turn signal lamp for indicating a traveling direction.

The invention enables installation of the light member in the body of the door mirror by butt contact in a positioned manner, thereby contributing to weight saving and a smaller the body.

The sealing performance between the light member and the body is improved and moreover it is possible to prevent backlash of the light member.

The invention also prevents downward slipping off of the light member.

The invention also makes it possible to install a turn signal lamp in any area of the body and it is therefore possible to enhance the degree of freedom of design.

DETAILED DESCRIPTION OF THE PREFERRED EMBODIMENT

Figure 1:
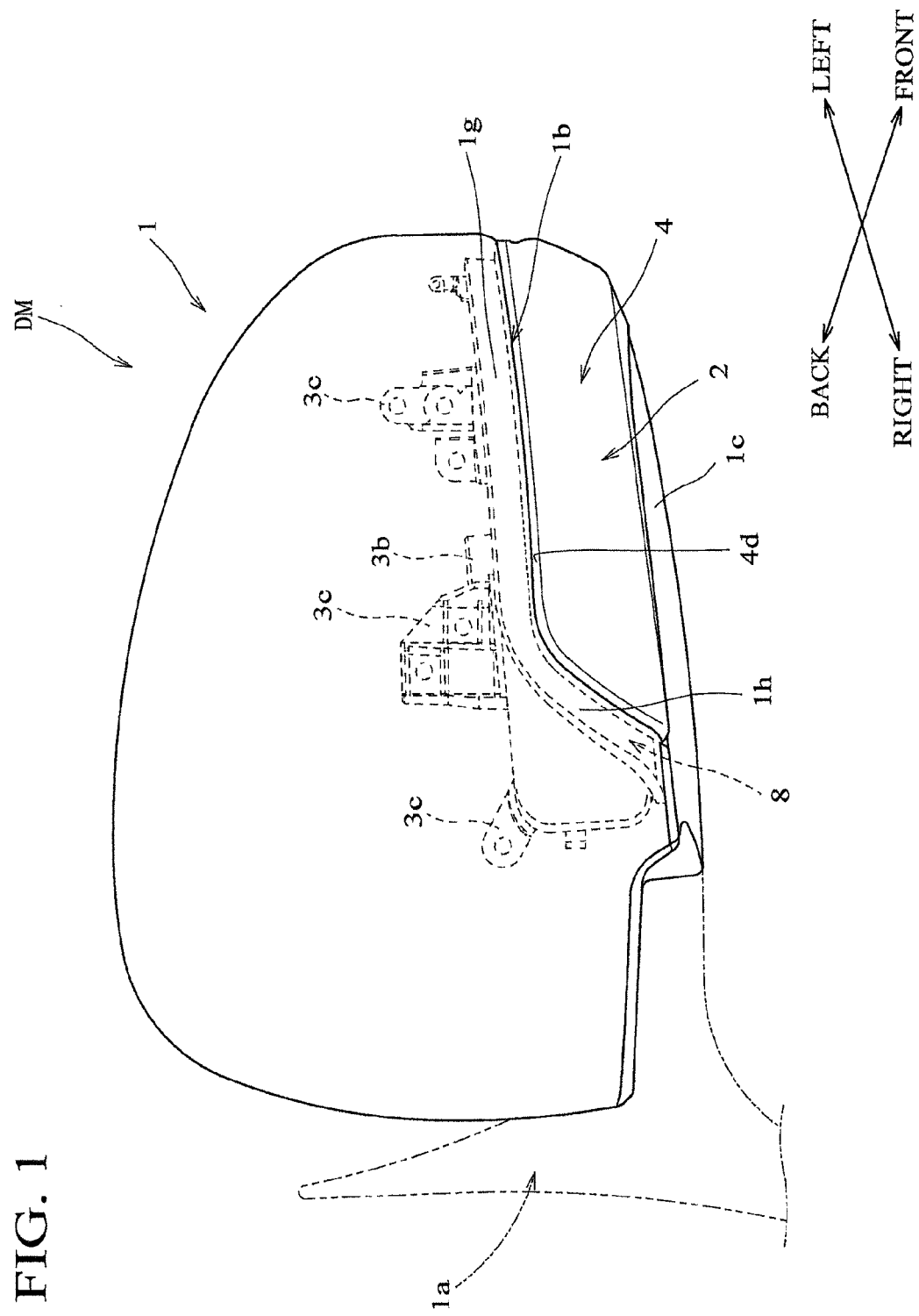
FIG. 1 is an overall perspective view of a door mirror.

Next, a description is given of an embodiment of the present invention with reference to the drawings.

Denoted by reference numeral 1 in the drawings is a body of a door mirror DM, which is to be provided on each of a door on the driver side and a door on the passenger side of a vehicle. An opening part (not illustrated) is formed at an area of the body 1 to face rearward (rearward from a vehicle), and a mirror (not illustrated) for rearward check is fitted in the opening part in such a manner that the position thereof can be freely adjusted. Furthermore, the body (door mirror DM) 1 is supported at a stay 1a, which is fixed at the door side, so as to be rotatable and can be rotated and switched to: a working position where the mirror faces rearward and enables rearward check by the driver; and a storage position where the mirror is positioned along the door face not to cause an obstruction.

The body 1 is formed in a bowl shape, which is bulging forward from the vehicle and opens rearward in the working position of the door mirror DM, and members for adjusting the position of the mirror and the like are held in the bulging part. Furthermore, an opening part 1b is formed at the body 1 by cutting a front area of a lower face away from a lower area of a front face, and a turn signal lamp (corresponding to a light member of the present invention) 2 for indicating the traveling direction (steering direction) of the vehicle is installed in the opening part 1b.

Here, bilaterally symmetrical door mirrors DM are respectively provided on right and left door members of the vehicle, although only a description of a door mirror DM illustrated in FIG. 1 to be provided on the left side of the vehicle is given and description of a door mirror DM at the right side will be omitted.

The turn signal lamp 2 to be installed in the body 1 (door mirror DM) is constructed to be installed respectively as an assembly in the opening part 1b formed at the body 1.

Figure 2A:
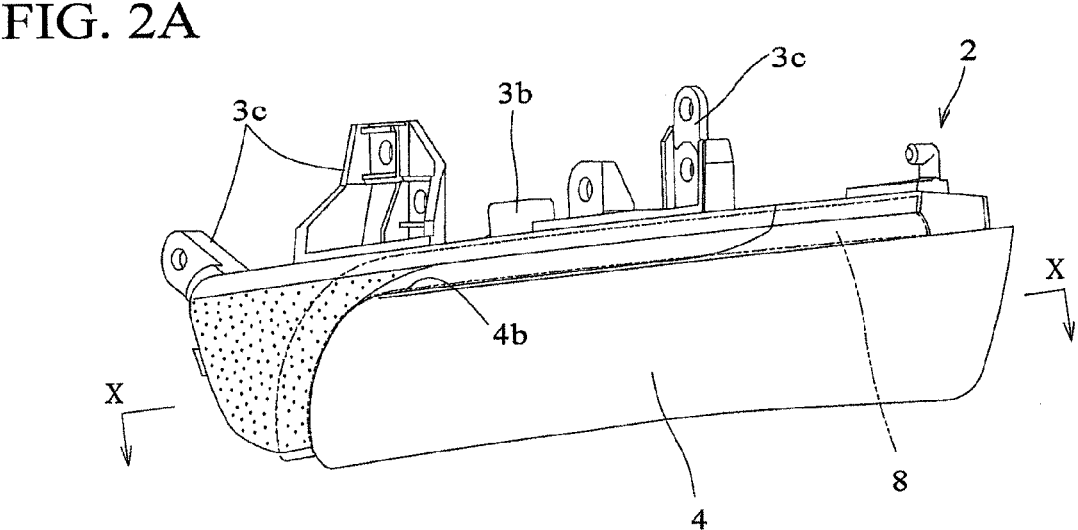
FIGS. 2A, 2B and 2C are respectively a front view of a turn signal lamp, a sectional view along X-X in FIG. 2A, and a side view.
Figure 2B:
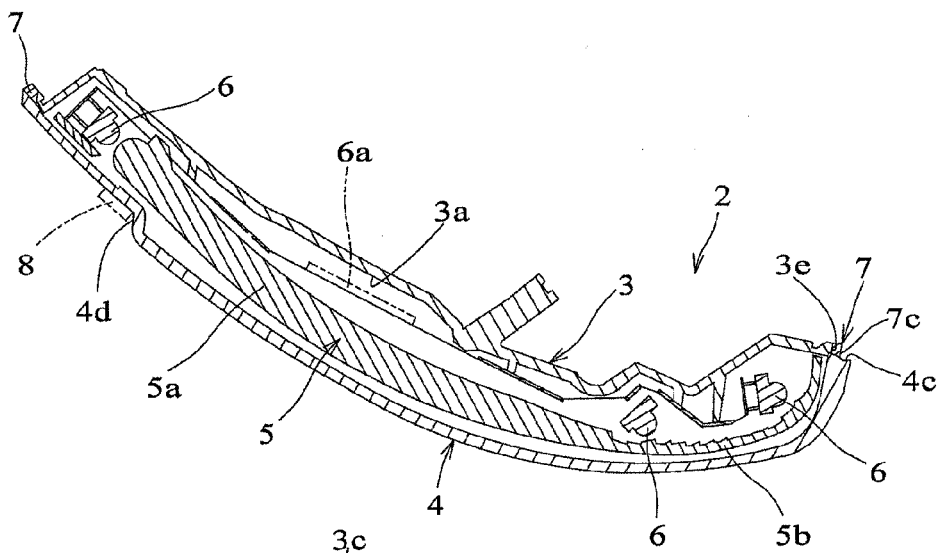
Figure 2C:
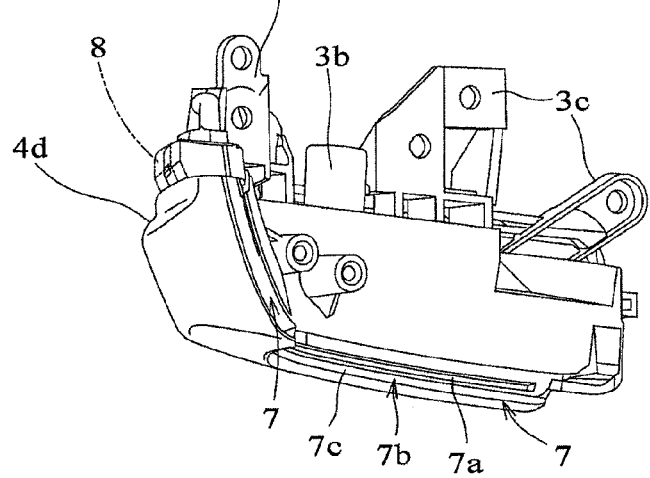
Figure 3A:
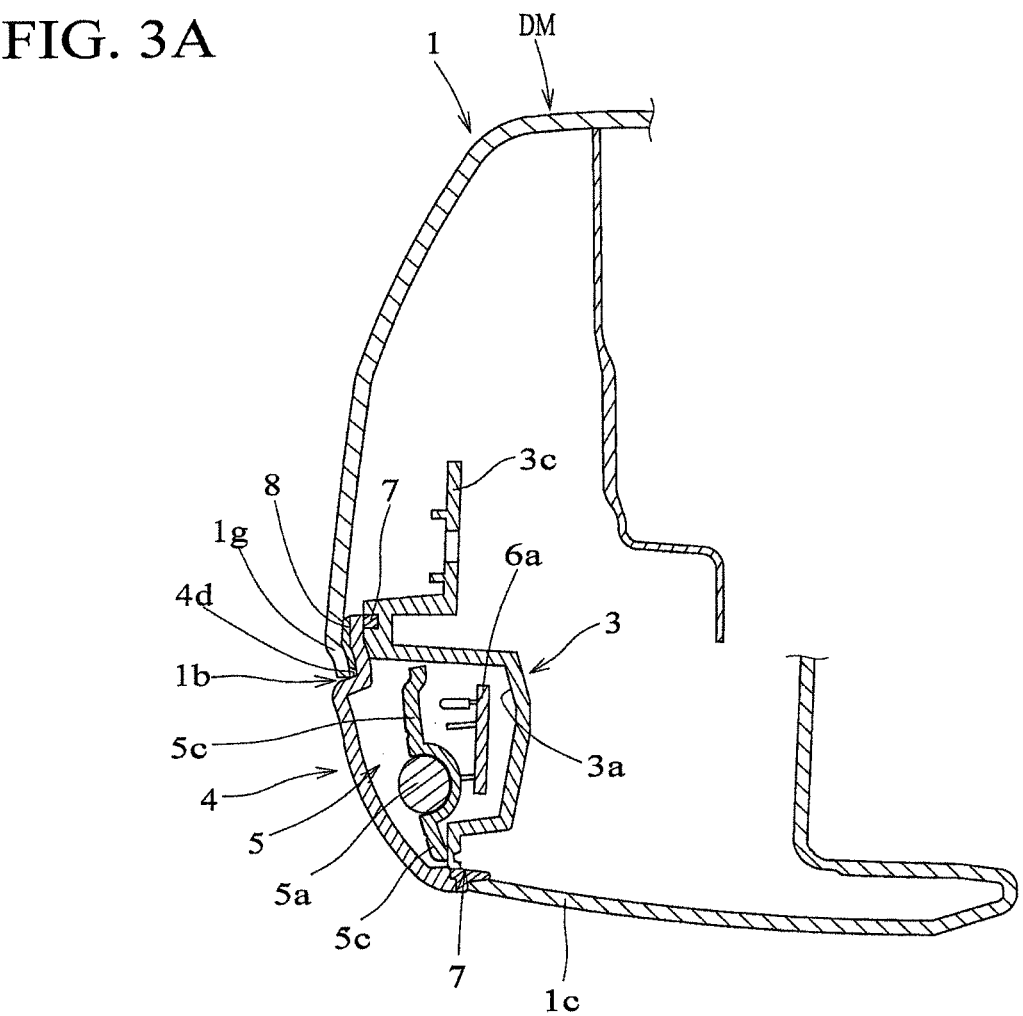
FIGS. 3A and 3B are respectively a longitudinal sectional view of a main part of a door mirror, and an enlarged view of a main part of FIG. 3(A).
Figure 3B:
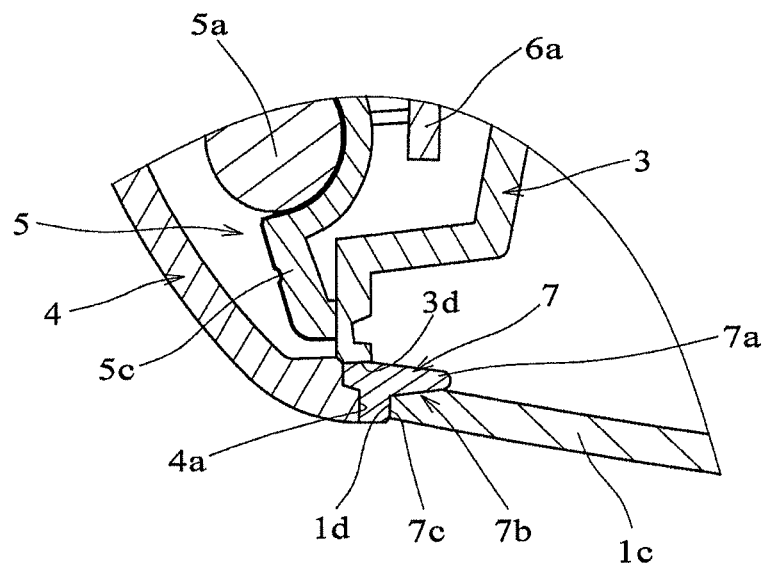
Figure 4:
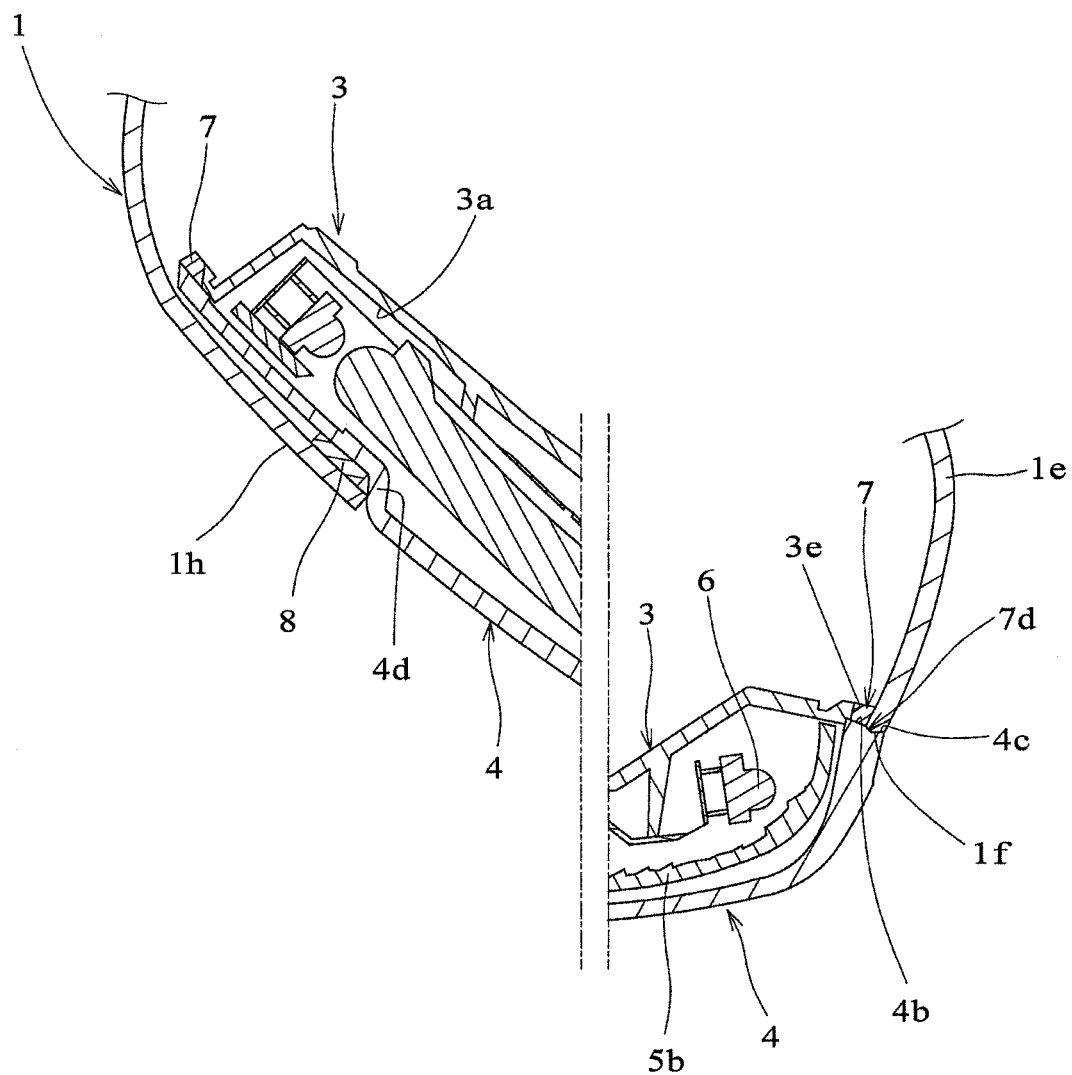
FIG. 4 is a transverse sectional view in which a part of a door mirror is cut away.

The turn signal lamp 2 is composed of: a base housing 3 to be held inside the body 1; an outer lens 4 to be exposed to the outside (forward) together with an outer peripheral face of the body 1; and an inner housing 5 to be provided between the base housing 3 and the outer lens 4 as illustrated in FIG. 2.

The base housing 3 is constructed by integral molding of opaque resin material in such a manner that a concave part 3a in a curved concave groove shape, which opens from a front area toward a left area, is formed, and the inner housing 5 is held in the concave part 3a. The inner housing 5 is composed of: an elongated light guide part 5a; an inner lens part 5b at the left end side of the light guide part 5a; and a pair of upper and lower flange piece parts 5c, which extend upward and downward from the light guide part 5a and cover the concave part 3a of the base housing 3. It is to be noted that the light guide part 5a and the inner lens part 5b are formed of transparent resin material and the flange piece parts 5c are formed of opaque resin material. Furthermore, the light guide part 5a, a plurality of light emitting diodes (corresponding to a light source of the present invention) 6 wherein light is to enter from the base housing 3 side to the inner lens part 5b, and a substrate 6a connected electrically with the light emitting diodes 6 are placed between the inner housing 5 and the base housing 3.

Denoted by reference numeral 3b is a connection part to be connected with an outer power source and denoted by reference numeral 3c is a mounting piece to be integrated with the body 1.

On the other hand, the outer lens 4 is formed of transparent resin material by integral molding and is formed in such a manner that an outer peripheral edge part thereof is made to butt contact with an outer peripheral edge part of the base housing 3. A jointing piece 7 is formed in a ring shape at a butt joint part (outer peripheral edge part), which is to be an outer peripheral edge part between the base housing 3 and the outer lens 4, by holding the inner housing 5 in the base housing 3, making the outer lens 4 butt joint with an open end part (outer peripheral edge part) of the base housing 3, which is in a state where the concave part 3a is covered with the flange piece parts 5c, and carrying out injection molding of transparent resin material at the butt joint part. In such a manner, the turn signal lamp 2 having the base housing 3 and the outer lens 4 integrated with each other is constructed.

Here, the jointing piece 7 is set to be formed by injection molding to have various shapes depending on the shape of a mold for retaining the base housing 3 and the outer lens 4.

A lower board thickness face 3d of the base housing 3 and a lower board thickness face 4a of the outer lens 4 are made to butt contact to face each other orthogonally at a butt joint part at a lower area of the butt joint part of the base housing 3 and the outer lens 4, and the faces 3d, 4a are integrated with each other by forming the jointing piece 7 by injection molding between the faces 3d, 4a. The jointing piece 7 formed at the lower area is formed to have a shape having a protrusion 7a protruding rearward from the upper half part and therefore the jointing piece 7 is set to be provided with a lower step part (corresponding to a positioning part of the present invention) 7c, which has an L shape and has a butt contact face 7b facing rearward.

Moreover, a left board thickness face 3e of the base housing 3 and a left board thickness face 4b facing rearward from the outer lens 4 are made to butt contact to face each other orthogonally at a butt joint part at a left area, which is outward in the horizontal direction of the vehicle, of the butt joint part of the base housing 3 and the outer lens 4, and the faces 3e, 4b are integrated with each other by forming the jointing piece 7 between the faces 3e, 4b. The jointing piece 7 formed at the left area is formed in such a manner that a half part of the outer lens left board thickness face 4b at the base housing 3 side and the base housing left board thickness face 3e are integrated with each other, and is set to be provided with a left step part (corresponding to a positioning part of the present invention) 7d at the left area, which has an L shape composed of an outer side board thickness face 4c of the outer lens left board thickness face 4b and the left end face of the jointing piece 7 and is provided with the outer side board thickness face 4c formed as a butt contact face facing rearward.

In order to install the turn signal lamp 2 in the opening part 1b of the body 1, the lower end edge part 1c at the body opening part 1b is fitted in the lower step part 7c, which is formed at the jointing piece 7 positioned at the lower side of the jointing piece 7 formed at the butt joint part of the base housing 3 and the outer lens 4, and a lower end face (lower board thickness face) 1d of the body opening part 1b is made to butt contact with the butt contact face 7c facing rearward so as to achieve positioning of the turn signal lamp 2 in the vertical direction while a lower end edge part 1c of the body 1 is positioned below the protrusion 7b so as to prevent downward slipping off of the turn signal lamp 2.

Furthermore, a left end edge part 1e at the body opening part 1b is fitted in the left step part 7d, which is composed of the jointing piece 7 positioned at the left side and the outer side board thickness face 4c at the left side of the outer lens 4, and a left end face (left board thickness face) 1f of the body opening part 1b is made to butt contact with the outer side board thickness face 4c of the outer lens 4 facing rearward so as to achieve positioning of the turn signal lamp 2 in the horizontal direction.

Furthermore, since the lower end edge part 1c of the body opening part 1b overlaps with the protrusion 7a of the jointing piece 7 and the left end edge part 1e of the body opening part 1b overlaps with the jointing piece 7 in the above installation state, the overlap part functions as fitting allowance of the body opening part 1b and the turn signal lamp 2, so as to improve the sealing performance of the turn signal lamp 2 and to prevent backlash.

The turn signal lamp 2, which is positioned relative to the body 1 as described above, is constructed in such a manner that an area between the upper end part and the right end part of the outer lens 4 is covered with an upper end edge part 1g and a right end edge part 1h at the opening part 1b of the body 1. In such a manner, adjustment allowance based on positioning of the lower area and the left area of the turn signal lamp 2 described above is set to be adjusted in overlap allowance of the upper end edge part 1g and right end edge part 1h of the body 1 and the outer lens 4.

The turn signal lamp 2 is constructed to be installed in the body 1 by fixing a frame member (not illustrated) held in the body 1 using the mounting piece 3c of the base housing 3 in the above state.

It is to be noted that a waterproofing sealing member 8 is interposed at an area, which is positioned above a step part 4d of the outer lens 4 and covered with the upper end edge part 1e and the right end edge part 1f of the body 1.

The present embodiment having the structure described above can simplify the structure of the body and facilitate the installation operation, since the turn signal lamp 2, which is prepared as an assembly, is constructed to be installed in the body 1 in order to install the turn signal lamp 2 for indicating the traveling direction in the body 1 in the door mirror DM. Furthermore, since the turn signal lamp 2 is integrated with the butt joint part of the base housing 3 and the outer lens 4, which are molded preliminarily, by injection molding of resin material to form the jointing piece 7, the outer peripheral edge part of the turn signal lamp 2, which is the butt joint part, has a satisfactory design and it is unnecessary to cover the outer peripheral edge part with the body 1 of the door mirror DM.

In such a structure, the step part 7b is formed at a lower jointing piece 7 of the jointing piece 7, which can be formed by injection molding to have various shapes, by forming the protrusion 7a while the outer side board thickness face 4c, which is the outer half part of the left board thickness face 4b of the outer lens 7, and the step part 7d are formed at a left jointing piece 7, and the turn signal lamp 2 can be installed by butt contact in a positioned manner relative to the body 1 by installing the turn signal lamp 2 while the lower end face 1d and the left end face 1f of the body opening part 1b are respectively made to butt contact with the faces 7c, 4c facing rearward from the step parts 7b, 7d. As a result, it is possible to prevent the body from growing in size as in a conventional installation state where an outer peripheral edge part of the turn signal lamp is covered with the body and to contribute to weight saving and downsizing of the body 1.

Furthermore, since the positioning part of the turn signal lamp 2 relative to the body 1 is composed of the step parts 7c, 7d formed using the jointing piece 7, an overlap part is formed between the lower end edge part and left end edge part of the body opening part 1b and the jointing piece 7 when the turn signal lamp 2 is installed and made to butt contact with the body opening part 1b, and the overlap part functions as fitting allowance of the turn signal lamp 2 relative to the body 1 so as to improve the sealing performance and to prevent backlash.

Furthermore, since the lower end edge part 1c of the body opening part 1b is fitted below the protrusion 7a of the jointing piece 7, which is formed at the lower side, of the jointing piece 7 formed at the outer peripheral edge part of the turn signal lamp 2, it becomes possible to prevent downward slipping off of the turn signal lamp 2 and to further ensure support of the turn signal lamp 2 at the body 1.

In such a structure wherein a positioning part is formed at the jointing piece 7 of the turn signal lamp 2, it is possible to install the turn signal lamp 2 no matter at which area the opening part of the body 1 is formed, and it is also possible to freely select and place an area in accordance with the function of the turn signal lamp 2 so as to enhance the visibility of the body 1.

The present invention relates to a door mirror to be provided on a vehicle such as an automobile, and it is possible to simplify the structure of the body of the turn signal lamp and to facilitate the installation operation by constructing a turn signal lamp as in the present invention. Moreover, there is industrial applicability in that it is possible to prevent the body of the turn signal lamp from growing in size and to contribute to weight saving and downsizing of the body.

The invention claimed is:

1. A rearview door mirror, comprising:
a body (1) with a front part having an opening (1b);
a turn signal lamp (2) installed into the opening (1b) of the body (1), the turn signal lamp (2) comprising:
a base housing (3) configured for installing a light source,
an outer lens (4), and
a jointing piece (7) formed by injecting a resin material between the base housing (3) and the outer lens (4) at:
a lower butt joint part where a lower edge (3d) of the base housing (3) and a lower edge (4a) of the outer lens (4) are adjacent and orthogonal to each other, and
an outer butt joint part where an outer edge (3e) of the base housing (3) and an outer edge (4b) of the outer lens (4) are adjacent and orthogonal to each other,
the jointing piece (7) at the lower butt joint part including:
a protrusion (7a) protruding rearward at an upper part of the jointing piece (7),
a rearwardly facing butt contact face (7c), and
a positioning part (7b) between the protrusion (7a) and the rearwardly facing butt contact face (7c) to define an L-shape,
the rearwardly facing butt contact face (7c) of the jointing piece (7) at the lower butt joint part butting against a lower edge (1d) of the opening (1a) of the body (1) and the positioning part (7b) of the jointing piece (7) at the lower butt joint part butting against a surface of the body (1) adjacent the lower edge (1d) of the opening (1) to position the turn signal lamp (2) in the opening (1b) of the body (1) and to prevent the turn signal lamp (2) from slipping off the body (1),
the outer butt joint part including:
an outer surface of the jointing piece (7) facing away from the outer edge (3e) of the base housing (3),
an outer part (4c) of an edge of the outer lens (4), and
a side step (7d) formed between the outer surface of the jointing piece (7) and the outer part (4c) of the edge of the outer lens (4), wherein
the turn signal lamp (2) is positioned horizontally at the opening (1b) of the body (1) by butting the side step (7d) to an inner part of an edge of the body (1) at the opening (1b) of the body 1 and by butting an outer part (1f) of the edge of the body (1) at the opening (1b) to the outer part (4c) of the lens (4).

* * * * *